(12) United States Patent
Vollath

(10) Patent No.: US 7,576,690 B2
(45) Date of Patent: Aug. 18, 2009

(54) POSITION DETERMINATION WITH REFERENCE DATA OUTAGE

(75) Inventor: Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/002,086

(22) Filed: Dec. 13, 2007

(65) Prior Publication Data

US 2009/0109090 A1 Apr. 30, 2009

Related U.S. Application Data

(60) Provisional application No. 61/000,990, filed on Oct. 29, 2007.

(51) Int. Cl.
*G01S 1/00* (2006.01)
(52) U.S. Cl. .............. 342/357.03; 342/357.09; 342/357.12
(58) Field of Classification Search . 342/357.07–357.1, 342/357.03, 357.12
See application file for complete search history.

(56) References Cited

U.S. PATENT DOCUMENTS

| | | | |
|---|---|---|---|
| 5,477,458 A | 12/1995 | Loomis | |
| 5,828,336 A | 10/1998 | Yunck et al. | |
| 6,324,473 B1 | 11/2001 | Eschenbach | |
| 6,490,524 B1 * | 12/2002 | White et al. | 342/357.1 |
| 6,529,830 B1 | 3/2003 | Eschenbach | |
| 6,741,935 B1 | 5/2004 | Eschenbach | |
| 6,879,283 B1 | 4/2005 | Bird et al. | |
| 7,432,853 B2 | 10/2008 | Vollath | |
| 2005/0101248 A1 | 5/2005 | Vollath | |
| 2007/0182628 A1 * | 8/2007 | Pomerantz et al. | 342/357.06 |
| 2008/0238765 A1 * | 10/2008 | Zhang et al. | 342/357.01 |

OTHER PUBLICATIONS

Navstar Global Positioning System, Interface Specification IS-GPS-200D, p. 88-89 and 163-164, Mar. 2006.*
Landau, Herbert et al., "Virtual Reference Stations Versus Broadcast Solutions in Network Rtk- Advantages and Limitations", Gnss 2003, Graz, Australia,(2003),1-15.

* cited by examiner

*Primary Examiner*—Thomas H Tarcza
*Assistant Examiner*—Fred H Mull

(57) ABSTRACT

Position determination at a rover station on the basis of positioning signals from a plurality of positioning satellites. During normal operation a position of the rover station is determined on the basis of the positioning signal from the positioning satellites and reference data received via a separate connection from a reference station. Upon detecting an outage of the reference data from the reference station, error data at least including satellite clock drifts is obtained from error data transmitter and applied in the determination process in order to eliminate positioning errors introduced by satellite clock drifts that cannot be compensated on the basis of the reference data due to the outage.

22 Claims, 8 Drawing Sheets

US 7,576,690 B2

POSITION DETERMINATION WITH REFERENCE DATA OUTAGE

RELATED U.S. APPLICATION

This application claims priority to the copending provisional patent application Ser. No. 61/000,990, entitled, Position Determination with Reference Data Outage with filing date Oct. 29, 2007, assigned to the assignee of the present application, and hereby incorporated by reference in its entirety.

BACKGROUND OF THE INVENTION

Various types of positioning systems for determining a position based on radio signals are known in the art. For example, satellite navigation systems allow autonomous geospatial positioning with virtually global coverage. Global navigation satellite systems (GNSS) provide GNSS receivers with the capability to determine their location based on positioning signals transmitted from the GNSS satellites in terms of longitude, latitude and altitude, to within a few meters or even centimeters.

GNSS based positioning has a wide range of applications, including navigation and tracking and automatic positioning.

Generally, for determining its position, a GNSS receiver first determines distances to a plurality of GNSS satellites. Each individual distance measurement made by the receiver to a satellite located in a known orbit position traces the receiver on the surface of a spherical shell at the measured distance from the satellite. By taking several such measurements and determining an intersecting point of the spherical shells, a position fix can be generated. The distance measurements to the satellites are based on a time of flight measurement of positioning signals transmitted by the satellites to the receiver and thus the measurements depend on an exact timing. Normally, three distance measurements to three known satellite positions are sufficient to resolve a receiver position in space, however, with time being the fourth unknown in the equations, measurements on four satellites are needed to determine the position of the receiver.

The orbit position of the satellite may be determined based on a data message superimposed on a code that serves as a timing reference. The receiver can compare the time of broadcast at the satellite encoded in the transmission with the time of reception measured by an internal clock at the receiver, thereby measuring the time of flight to the satellite. Some GNSS systems provide satellites that transmit a code with a timing reference, enabling a receiver to compare a successively delayed internal replica of this code with the received code from the satellite, and, when determining a match of the codes, to determine the amount of delay. This type of code based positioning allows accuracies within several meters.

For higher accuracies Real-Time Kinematic (RTK) positioning is known. RTK positioning employs measurements on a carrier phase of the positioning signals from the satellites. In RTK it is not a code that is compared with a delayed internal version of the code, but the carrier itself is used in the comparison process. By using the phase of the carrier signal from the satellite centimeter accuracy positioning can be achieved.

Various error sources, however, affect the absolute positioning accuracy. As noted above, the exact time of flight of the signal from the satellite to the receiver station must be measured, which may be in the range of e.g. 0.06 seconds from a satellite directly above a receiver. In order to make the time measurements as accurate as possible, GNSS satellites generally include several atomic clocks providing a highly accurate time reference. However, still, even atomic clocks suffer from a certain time error that constitutes an error source in the measurements that has to be observed when desiring centimeter level accuracy. Other error sources deteriorate the positioning result, including propagations delays introduced by the troposphere and ionosphere, orbit errors in the satellite positions, relativistic effects, as known in the art.

To improve the accuracy of the estimation, systems for example performing a positioning based on carrier phase measurements often provide reference data from another source to a receiver or rover station, e.g. via ground based radio transmission, in order to enable the receiver or rover station to eliminate the positioning errors introduced by the error sources. For example, a reference station with its exact position known may be used to eliminate errors in the measurements taken by a rover station, if in the approximate same geographical region. Measurements made at the reference station can then be transmitted from the reference station to the rover station and used thereat to eliminate the errors in the position determining process. For example, if it is assumed that the errors in the receiver measurements and reference station measurements are the same, the rover station may eliminate the errors by determining a difference between the measurement at the receiver and at the reference station.

While having the advantage of improved position determination results if the rover station uses reference data from reference stations and thus facilitating applications requiring highest accuracy, the positioning accuracy now relies on the permanent availability of the reference data. Especially on remote construction sites or in agricultural applications it may, however, be difficult to provide the reference data at all times to a rover station, causing a deterioration of the position determination during the times of unavailability of reference data which obviously is undesirable or even dangerous, for example in automatic positioning applications.

SUMMARY OF THE INVENTION

It is therefore desirable to provide for high accuracy positioning results even during the outage of reference data from a reference station.

According to an embodiment of the invention a rover station for determining a positioning includes a positioning signal receiver to receive positioning signals from each of a plurality of positioning satellites, a reference data receiver to receive reference data from at least one reference station, a positioning unit to determine a position of the rover station for a first instance in time based on positioning signals for the first instance in time and the reference data for the first instance in time, an outage detection unit for detecting an outage of the reference data from the at least one reference station, an error data receiver to receive for each of the satellite clocks error data specifying a satellite clock drift, wherein the positioning unit is adapted to determine the position of the rover station for a second instance in time based on positioning signals for the second instance in time, the stored reference data for the first instance in time and the satellite clocks error data at least for the second instance in time. Accordingly, during times of outage of reference data from the reference station, the rover station obtains error data specifying the clock drifts at the positioning satellites and thus enables the rover station to improve the accuracy of the positioning result based thereon.

According to another example the positioning unit, for determining the position of the rover station at the second instance in time, is adapted to determining reference data for the second instance in time based on the reference data for the first instance in time and the satellite clocks error data for the second instance in time, and to determine the position of the rover station for the second instance in time based on the estimated reference data for the second instance in time and the positioning signals for the second instance in time. Accordingly, upon an outage of the reference data from the reference station at a current point in time, the last available reference data can be propagated over time based on the satellite clocks error data and the propagated reference data can be used for determining subsequent positions of the rover station during the outage of the reference data.

According to another example the positioning unit for determining the position of the rover station at the second instance in time is adapted to correct the positioning signals received from the positioning satellites for the second instance in time based on the satellite clocks error data for the second instance in time, and to determine the position at the second instance in time based on the corrected positioning signals for the second instance in time and the reference data for the first instance in time. Accordingly, the reference data can be employed as last received while the positioning signals from the satellites are corrected based on the clocks error data.

According to another example the positioning unit, for determining the position of the rover station at the second instance in time is adapted to obtain a position vector of the rover station for the first instance in time, to obtain a first position difference vector using a delta phase method based on the positioning signals and the reference data of the first instance in time, and the positioning signals of the second instance in time and the satellite clocks error data; and to add the first position difference vector to the position vector of the first instance in time. Accordingly, upon outage of the reference data the current position of the rover station can be estimated using the delta phase method by calculating a difference vector from a previous instance in time to the current instance in time based on the satellite clocks drift information at the current instance in time and by adding the difference vector to the position vector at the previous instance in time.

According to another example, the position vector of the first instance in time can be obtained by the positioning unit by obtaining a second position difference vector using the delta phase method based on positioning signals and reference data for a third instance in time proceeding the first instance in time, and the positioning signals and the reference data of the first instance in time and by adding the second position difference vector to a position vector of the third instance in time. Accordingly, a position difference vector can be computed based on the preceding two instances in time at with reference data was available, while then another position difference vector is estimated based on the satellite clocks error data and, both difference vectors are added up to estimate the position of the rover station. This is advantageous in the presence of cycle slips at the satellites, i.e. errors in the determination of the range information to individual once of the satellites.

According to another example the reference data transmitted from the at least one reference station to the rover station may include at least one of range corrections for each of the plurality of satellites and raw observations of the at least one reference station. Accordingly, the reference data with the range corrections and raw observations only implicitly includes information on clock errors, reducing an amount of data required to be transmitted between the reference station and the rover station.

According to another example the error data receiver is adapted to receive the clock error data from at least one of the plurality of positioning satellites, an alternative satellite source, and a ground base station via a wireline or wireless communication.

The error data may be received at predetermined time intervals over a low band width link.

According to another example, the positioning unit is arranged to obtain a time dependent relativistic clock error for each of the satellites and to correct the position of the rover station based thereon.

Accordingly, the positioning result may be also improved by removing any errors doing to relativistic effects.

According to another example the positioning unit is arranged to obtain a time dependent satellite orbit error for each of the satellites and to correct the position of the rover station based on the satellite orbit errors.

According to another example a position determining method includes receiving positioning signals from each of a plurality of position satellites, receiving reference data from at least one reference station, determining a position of the rover station for a the first instance in time based on positioning signals for the first instance in time and reference data for the first instance in time, detecting an outage of the reference data from the at least one reference station, obtaining for each of the satellite clocks error data specifying a satellite clock drift, and determining the position of the rover station for a second instance in time based on positioning signals for the second instance in time, the reference data for the first instance in time and the satellite clocks error data at least for the second instance in time.

According to another example, a program includes instructions adapted to cause data processing means of the rover station to carry out a positioning method according to the above.

According to another example, a computer readable medium may be provided in which a program is embodied where the program is to make data processing means to execute the method above.

According to another example a computer program product is provided comprising the computer readable medium.

Further embodiments of the invention are disclosed in the dependent claims.

DETAILED DESCRIPTION OF THE PREFERRED EMBODIMENTS

Figure 1:
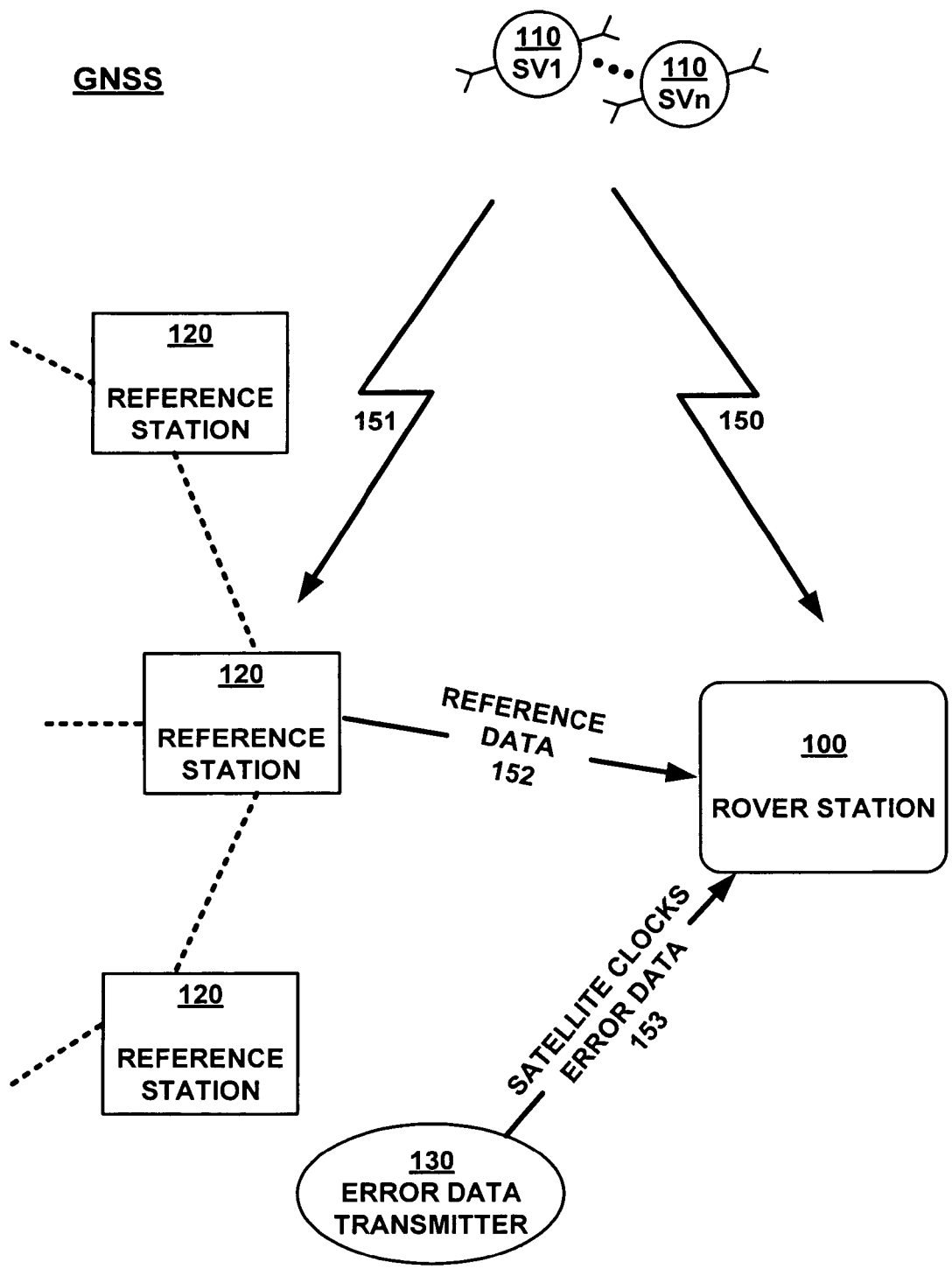
FIG. 1 schematically illustrates an embodiment of a rover station to determine a position of the rover station based on positioning signals from satellites and reference data of embodiment of the invention.

FIG. 1 illustrates a general overview of a GNSS including a rover station for determining a position based on positioning signals from a plurality of positioning satellites according to an embodiment of the invention.

According to FIG. 1, during normal operation a position of the rover station is determined on the basis of the positioning signals, as indicated by arrow 150, from the positioning satellites and reference data received via a separate connection from a reference station. Upon detecting an outage of the reference data from the reference station, error data specifying a clock error, e.g. including information on a satellite clock difference between a first instance in time and a second instance or satellite clock drifts, is obtained from error data transmitter and applied in the determination process in order to eliminate positioning errors introduced by satellite clock drifts that cannot be compensated on the basis of the reference data due to the outage.

Generally, FIG. 1 shows a rover station 100 receiving positioning signals from a plurality of positioning satellites SV1 . . . SVn 110, for example of a global navigation satellite system (GNSS) system. Positioning signals preferably are received from at least four positioning satellites, enabling the rover station to determine its position on the earth surface, e.g. in terms of longitude, latitude and altitude. Generally, the rover station employs any technique to receive and process positioning signals from the satellites 110, including signals of GPS, GLONASS, Compass, Galileo, IRNSS or as used in any other GNSS.

However, various error sources negatively affect the accuracy of the position determination at the rover station. The error sources include clock errors, ionosphere effects, ephemeris or orbit errors, multi path distortion, relativistic effects and troposphere effects, as generally known in the art.

Associated positioning errors can be efficiently removed, e.g. based on reference data in an RTK system that is made available by a reference station or reference station network and/or using single differencing or double differencing techniques, according to which multiple measurements affected by the same error sources are subtracted from one another to remove the errors. For example, single difference techniques, forming a difference between measurements to two satellites, allows removal of satellite clock errors, and double difference techniques generally allow to remove clock errors at a rover station and reference stations.

FIG. 1 illustrates a reference station 120 that may form part of a reference station network. Each reference station is located at an exactly known position and able to make measurements based on the positioning signals from the satellites for comparison of the detected position with the known reference station position. Reference station networks may be provided based on a grid with a spacing of e.g. 20 km or 100 km. Also systems with spacings of 1000 km are conceivable.

The reference station 120 obtains reference data on the basis of measurements taken by the reference station using the positioning signals from the plurality of satellites 110, as indicated by the arrow 151. The reference data are transmitted to the rover station 100, as indicated by the arrow 152. The measurements taken by the reference station or multiple reference stations allow elimination of most error sources for example by single differencing or double differencing, as noted above.

The reference data transmitted from the reference station to the rover station may be in the form of raw observations or measurements taken by the reference station or taken in a reference station network, or may have been processed to reduce an amount of data to be transmitted, e.g. to provide positioning errors in terms of Cartesian coordinates or in terms of longitude, latitude and altitude to be expected at the rover station.

The reference data thus does not include an explicit quantification of the respective errors introduced by the individual error sources, these values are only implicitly contained in the reference data as any measurements made at the reference station and at the rover station are subjected to approximately the same error sources. It is noted that for improving the error removal process, the reference data may also include so called error maps enabling a shifting of the reference data that are valid for the position of the reference station to the actual position of the rover station. This is particularly applicable for errors due to atmospheric influences. Still further, the reference data may include range corrections for each of the plurality of satellites, i.e. a specification of the range corrections to be applied when determining a position of the rover station.

For determining its position, the rover station 100 measures distances from the rover station to a plurality of satellites 110 based on a time of flight of radio signals from the satellites to the rover station. For measuring the time of flight of a signal travelling at this speed of light, very precise clocks are required. As an example, a radio signal from a GNSS satellite may travel to a receiver on the earth's surface in about 0.06 seconds, and any error in the measurement of the time of flight translates into a position error by multiplication with the speed of light.

For measuring the time of flight of a radio signal from a satellite to the rover station, the rover station may compare a bit sequence received from the satellite or directly the carrier signal, so called carrier phase processing, received from the satellite with an internally generated version thereof. By comparing the rising and trailing edges of the bit transitions of the successively delayed internal version of the signal with the signal from the satellite, ultimately a match can be found and the amount of time shift of the locally generated version of the bit sequence necessary constitutes the time delay and thus time of flight allowing to obtain a distance to the satellite. By a similar procedure a phase shift can be determined in carrier phase applications such as RTK.

Generally, the positioning signals from the satellites are transmitted at known instances in time and may be provided with a time tag, both being determined on the basis of highly accurate clocks at the satellites. For example, GNSS satellites may carry at least one highly accurate atomic clock for timing a transmission of the positioning signals. In order to measure the time of flight, the rover station itself also is required to provide timing signals that are usually generated on the basis of an internal rover unit clock, e.g. a quartz clock or any other kind of timing device. Both clocks, at the satellite at the receiver, however, are of limited accuracy and the time deviations introduced by the respective clocks translates into a range error. Conceivably, with the short times of flight of radio signals from the satellites to the rover station, the slightest clock errors translate into comparatively large positioning errors. It is noted that even though the atomic clocks at the satellite are highly accurate, they suffer from a random drift.

Various techniques are known to resolve clock errors, most notably single or double differencing techniques including multiple measurements to the same or different satellites and on the basis of reference data transmitted from the reference station to the rover station. More precisely, any measurements at the reference station 120 of a position based on the positioning signals from the satellites will suffer from the same error attributed to a satellite clock drift as a corresponding measurement at the same time at the rover station. As the exact position of the reference station is known, the measurement at the reference station can be used at the rover station to eliminate the clock error attributed to the satellite clock drift. Therefore, if the reference data from the reference station 120 is available at the rover station 100, the rover station can most accurately determine its position based on the positioning signals from the satellites 110 and the reference data.

It is noted that other errors apart from a clock error, such as errors introduced by signals travelling through the troposphere and errors introduced by deviations of the satellite orbits, can also only be corrected on the basis of the reference data from the reference station. Any errors introduced by the signals travelling through the ionosphere, as they are frequency dependent, can be also removed directly at the rover station, if the rover station performs measurements of positioning signals in different frequencies.

Accordingly, during normal operation of the described GNSS system, the rover station performs a positioning determination based on positioning signals received from the plurality of satellites and based the reference data from the reference station.

Below an example is given for so-called raw observations at reference stations, specifying the individual components and error sources in the observations, e.g. for an RTK system.

Real Time Kinematic (RTK) satellite navigation is a technique used e.g. in land surveying applications, machine control, agriculture, etc., that is based on the use of carrier phase measurements of the GPS, GLONASS and/or Galileo signals, etc., where a single reference station provides real-time reference data for a centimeter level of accuracy. When referring to GPS in particular, the system may also be referred to as Carrier-Phase Enhancement, CPGPS.

Some types of satellite navigation receivers compare a pseudorandom signal being sent from the satellite with an internally generated copy of the same signal. Since the signal from the satellite takes time to reach the receiver, the two signals do not "line up" properly, the satellite's copy is delayed in relation to the local copy. By progressively delaying the local copy more and more, the two signals will eventually line up properly. That delay is the time needed for the signal to reach the receiver, and from this the distance from the satellite can be calculated.

In general receivers are able to align the signals to about 1% of one bit-width. For instance, the C/A signal sent on the GPS system sends a bit every 1/10th of a microsecond, so a receiver is accurate to 1/100th of a microsecond, or about 3 meters in terms of distance.

RTK follows the same general concept, but uses the satellite's carrier as its signal, not the messages contained within. The improvement possible using this signal is potentially very high if one continues to assume a 1% accuracy in locking. For instance, the GPS C/A signal broadcast in the L1 signal changes phase at 1.023 MHz, but the L1 carrier itself is 1575.42 MHz, over a thousand times faster. This corresponds to a 1% accuracy of 19 cm using the L1 signal, and 24 cm using the lower frequency L2 signal.

The difficulty in making an RTK system is properly aligning the signals. The navigation signals are deliberately encoded in order to allow them to be aligned easily, whereas every cycle of the carrier is similar to every other. This makes it difficult to know if the signals are properly aligned, or are off by one more cycles and thus introducing an error of 20 cm or a larger multiple of 20 cm. In practice, RTK systems use a reference station to re-broadcasts the phase of the carrier that it measured, and the mobile units compare their own phase measurements with the ones received from the base station. This allows the units to calculate their relative position to millimeter accuracy, although their absolute position is accurate only to the same accuracy as the position of the base station.

Although the requirement of reference data makes the RTK more difficult to use, it is perfectly suited surveying applications. In this case, the reference station is located at a known surveyed location, a benchmark, and the rover station can then produce highly accurate measurements relative to that point. RTK is also used in autodrive/autopilot systems, precision farming and similar.

The Virtual Reference Station (VRS) method extends the use of RTK to a whole area of a reference station network. Operational reliability and the accuracies to be achieved depend on the density and capabilities of the reference station network.

In an example given below, basics of an RTK based positioning system with reference data for use at a rover station is outlined in more detail.

Throughout this document some definitions will be used to simplify presentation.

sv=positioning satellite;

rsv=reference satellite rcv=receiver, rover or reference station;

rov=rover station;

ref=reference station;

Below, $\Phi$ constitutes phase ranges, i.e. a carrier phase measurements multiplied with the carrier wavelength. Where no time difference observations are used, it is assumed that the ambiguities have been determined and removed from the phase measurements, e.g. in a double difference consistent sense. The raw observations or reference data from the reference station can then be denoted as $$\Phi_{rcv}^{sv}(t) = R_{rcv}^{sv}(t) + c \cdot (\delta t_{rcv}(t) - \delta t^{sv}(t) - \delta r^{sv}(t)) - io_{rcv}^{sv}(t) + tr_{rcv}^{sv}(t) + b_{rcv} + b^{sv} + v_{rcv}^{sv}(t)$$

with

| | |
|---|---|
| $\Phi_{rcv}^{sv}(t)$ | Phase range as measured from satellite sv to receiver rcv at time t |
| $R_{rcv}^{sv}(t)$ | Geometric range from receiver rcv position to satellite sv phase center position at time t |
| c | Speed of light (299792458 m/s) |
| $\delta t_{rcv}(t)$ | Receiver rcv clock error at time t |
| $\delta t^{sv}(t)$ | Satellite sv clock error at time t |
| $\delta r^{sv}(t)$ | General relativistic correction of satellite sv at time t (if not included in the satellite clock error) |
| $io_{rcv}^{sv}(t)$ | Ionospheric delay (= phase advance) of the signal between receiver rcv and satellite sv at time t |
| $tr_{rcv}^{sv}(t)$ | Tropospheric delay of the signal between receiver rcv and |

-continued

| | |
|---|---|
| | satellite sv at time t |
| $b_{rcv}$ | Receiver rcv hardware bias of all phase signals receiver by rcv, (almost) constant in time |
| $b^{sv}$ | Satellite sv hardware bias of all phase signals transmitted by sv, (almost) constant in time |
| $v_{rcv}^{sv}(t)$ | Noise components (white, noise, multipath, etc.) of the signal as receiver from satellites sv by receiver rcv at time t |

The broadcast values from the reference station include errors with respect to the true values according to:

$$bR_{rcv}^{sv}(t) = R_{rcv}^{sv}(t) + \epsilon R_{rcv}^{sv}(t)$$

$$b\delta t^{sv}(t) = \delta t^{sv}(t) + \epsilon \delta t^{sv}(t)$$

with

| | |
|---|---|
| $bR_{rcv}^{sv}(t)$ | Broadcast geometric range information derived from the broadcast orbit, from receiver rcv position to satellite sv position at time t |
| $\epsilon R_{rcv}^{sv}(t)$ | Error in the broadcast geometric range information derived from the broadcast orbit, from receiver rcv position to satellite sv position at time t |
| $b\delta t^{sv}(t)$ | Broadcast satellite clock error at time t |
| $\epsilon \delta t^{sv}(t)$ | Error in the broadcast satellite clock error at time t |

The broadcast data corrections are applied to the measurement at the rover station for position determination as:

$$bc^{sv}(t) = c \cdot (b\delta t^{sv}(t) + b\delta r^{sv}(t))$$

Prepared observation data for the example of double differencing positioning techniques read as:

$$\Phi c_{ref}^{sv}(t) = \Phi_{ref}^{sv}(t) - bR_{ref}^{sv}(t)$$

Fully prepared observation data for non-synchronized (same reception time) data, the broadcast corrections can be applied as follows:

$$\Phi f_{ref}^{sv}(t) = \Phi c_{ref}^{sv}(t) + bc^{sv}(t)$$

The above example RTK positioning system based on reference data broadcast from the reference stations allows positioning accuracies for example within the centimeter level range.

In RTK for single difference processing the reference data are subtracted from the rover data to cancel errors, as outlined above, as:

$$\Phi c_{rov,ref}^{sv}(t) = \Phi c_{rov}^{sv} - \Phi c_{ref}^{sv}$$

The observation still contains differential receiver biases, differential atmospheric errors, differential receiver clock errors, differential orbit errors and differential noise.

For simplicity of the formulas, the rest of this example uses double differences to cancel out the receiver clock errors. The correct use of these observables is well-known. It has also been shown in the literature that the results are equivalent to single difference processing, given that no precise information about the evolution of both receiver clocks is available.

$$\Phi c_{rov,ref}^{sv,rsv}(t) = \Phi c_{rov,ref}^{sv}(t) - \Phi c_{rov,ref}^{sv}(t)$$

The observation contains the differential atmospheric errors, differential orbit errors and differential noise.

As noted above, correction or reference data are transmitted from the reference station to the rover station.

On transmitting reference data, some known terms (geometric range, broadcast satellite clock error and relativistic correction as well as a rough estimate of the receiver clock error) may be removed from the raw observations to get a smaller value range for transmission over a bandwidth limited data link. In this case, however, it must be known at the rover exactly which corrections (except the receiver clock error) have been applied. Moreover, in GPS, the "Issue of Data Ephemeris" IODE needs to be transmitted, too, which results in an eight bit overhead. As a convention, usually the negative value is used so that it can be added to the rover observations as opposed to subtracting them (differencing).

$$\Phi co = \Phi_{rcv}^{sv}(t) - (bR_{rcv}^{sv}(t) + \delta r_{rcv}(t) - bc^{sv}(t))$$

The correction contains the errors in the broadcast satellite clock and range values and the information on satellite bias, orbit error plus receiver noise.

The correction or reference data are applied at the rover to the data obtained by the rover station by addition. The correction terms applied to the reference data have to be consistently applied to the rover data as well as:

$$\Phi f co_{rov,ref}^{sv,rsv}(t) = \Phi f_{rov}^{sv}(t) - \Phi f_{rov}^{rsv}(t + (\Phi co_{ref}^{sv}(t) - \Phi co_{ref}^{rsv}(t))$$

In the above outlined example it is very desirable that the reference data at all times are present, to continuously provide the achievable accuracies. Any unavailability of reference data will lead to a progressively increasing error in the position determination at the rover station. Outages of the reference data may be caused by fading, radio link failures, shadowing, or any other degradation of the quality of the path used for transmitting the reference data to the rover station.

Especially if reference data outages are unpredictable, the associated position deviations may cause problems in high precision positioning or automatic control applications. For example an automatically positioned tractor in an agricultural application may deviate from its travel route and thus may cause missing specified accuracies for an application, e.g. 5 cm track repeatability.

Upon analyzing the influences of the respective error sources, i.e. satellite clock drifts, orbit errors and tropospheric errors that usually are corrected on the basis of the broadcast reference data from the reference station, it can be noted that the satellite clock drift accounts for a large portion of the associated positioning error during absence of reference data. Upon outage of reference data, orbit errors and troposphere based errors also contribute to positioning errors, but to a lesser degree.

According to the present embodiment, therefore, in order to avoid or mitigate the negative effects of an outage of reference data, an error data transmitter 130 is provided that prepares information on the error sources, including a satellite clock drift associated with each of the positioning satellites, and transmits the error data on the satellite clock drifts to the rover station 100, as indicated by the arrow 153. The satellite clock drifts of the clocks at the positioning satellites may be specified in terms of two absolute time measurements per clock, in terms of a time difference or deviation per clock or the clock drifts may be specified otherwise.

The satellite clocks error data preferably are transmitted via a reliable transmission link to the rover station 100. As the amount of data to be transmitted is comparatively low, the transmission link may be constituted by a low frequency low bandwidth radio link. Alternatively, or in addition thereto, a mobile telephone connection may be used. Still further, a satellite transmission link from one of the positioning or an alternate satellite can be used.

The satellite clocks error data enables the rover station to explicitly obtain the individual satellite clock drifts and thus enables the rover station to appropriately correct the positioning determination results at the rover station in the absence of reference data. In this connection, with the exact amount of satellite clock error known at the rover station, the determination results of a position based on positioning signals from the plurality of satellites in the absence of reference data can be corrected on the basis of the satellite clock errors. For example, for the correction process information on the satellite clock difference between a first instance in time and a second instance in time can be used.

Thus, the satellite clocks error data for a current point in time, e.g. specifying the needed clock difference between the previous instance in time and a current instance in time can be used together with the positioning signals of the current point in time and, as the reference data is unavailable, with the reference data from a previous point in time when the reference data was still available.

More precisely, the satellite clocks error data can be used to estimate the reference data for the current point in time and the corrected reference data can be used for the positioning determination. Alternatively, the satellite clocks error data can be used to correct the calculation of the position determined on the basis of the positioning signals, i.e. time error of the positioning signals from the positioning satellites can be corrected on the basis of the satellite clocks error data and the corrected positioning signals together with the latest available reference data can be used for determining a position of a current point in time with the reference data unavailable. Finally, a delta phase method may be employed, for example in an RTK positioning system, the delta phase method being used to compute a position correction vector on the basis of the satellite clocks error data and by adding the correction vector to a last position determination result with the reference data available.

These procedures for considering the satellite clocks error data from the error data transmitter 130 at the rover station 100 will be disclosed with regard to further embodiments.

The error data transmitter 130 may be any source for error data, including one of the plurality of positioning satellites; an alternate satellite source such as a specialized geo stationary satellite, etc.; and a ground based station via wireline or wireless communications, including mobile telephone networks, public telephone networks or combinations thereof.

In an alternative the error data does not only include satellite clocks error data, but also information on an orbit error of each of the plurality of positioning satellites. As the position of the reference stations of the network is exactly known, the reference station may quantify an orbit error of each of the plurality of positioning satellites by comparing measurement results with an expected orbit position of each of the positioning satellites. Information on the individual satellite orbit errors may thus be determined and included into the error data transmitted from the error data transmitter 130 to the rover station 100. The orbit error may be specified in terms of Cartesian coordinates such as WGS84, or in terms of longitude, latitude and altitude, e.g. as a corresponding difference vector, or in any other coordinate system or any other form.

Moreover, the earth atmosphere, particularly the troposphere affects the propagation of radio signals from the positioning satellites to the rover station. The error data transmitted from the reference station or reference station network to the rover station may thus additionally include error data on the error introduced by the earth troposphere. Again, as the position of the reference station or the reference stations of the network are exactly known, this error can also be quantified at the reference stations, e.g. as an additional delay for signals from the positioning satellites, or as a position error introduced by this delay, e.g. in terms of longitude, latitude and altitude or any other quantity.

Accordingly, upon determining an absence of the reference data from the reference station 120, the rover station 100 obtains error data at least including satellite clocks error data from the error data transmitter 130 and determines a current position of the rover station on the basis of the positioning signals from the plurality of positioning satellites at the current point in time, the latest available reference data before the outage, and the satellite clocks error data of the current point in time or other error data of the current point in time.

It is noted that for high precision estimations of the position of the rover station during reference data outages, the position determination depends on the accuracy of the last positioning result with the reference data present. Therefore, it is desirable to provide a highly accurate position determination during the availability of reference data, as during the reference data outage any deviation of the position determination from a true position may significantly decrease the accuracy of the position estimation during the reference data outage.

The above described embodiment enables an accurate positioning estimation an outage of reference data normally received from a reference station or reference station network, by estimating the position during the reference data outage on the basis of the positioning signals received from the plurality of satellites and error data received from an error data transmitter 130, at least including satellite clocks error data.

In the following a further embodiment of the invention will be described with regard to FIG. 2.

Figure 2:
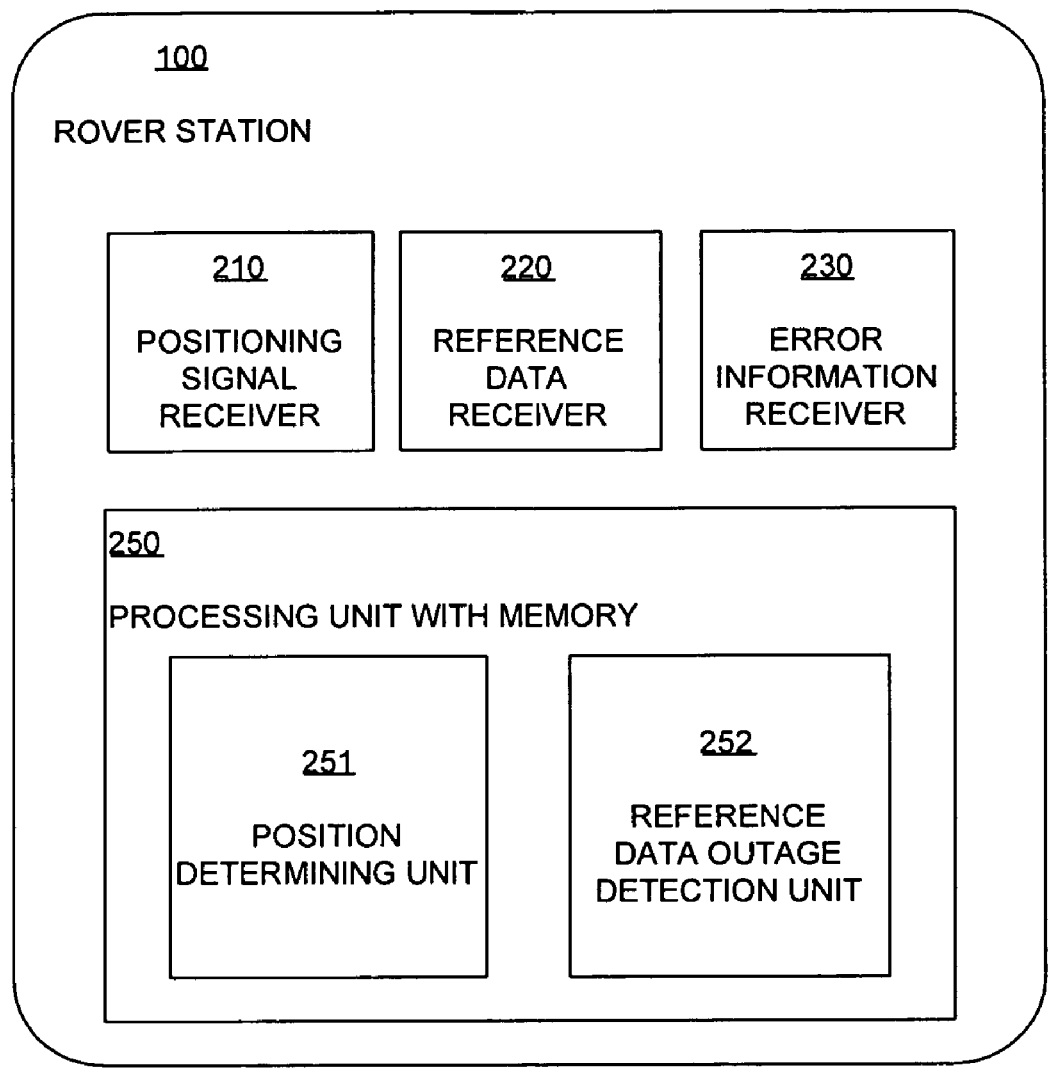
FIG. 2 illustrates elements of a rover station according to another embodiment of the invention.

FIG. 2 illustrates elements of a rover station for determining a position on the basis of a plurality of positioning satellites according to another embodiment of the invention. The rover station may be employed in the arrangement of FIG. 1, however, is not limited thereto.

The rover station performs a determination of a position of the rover station on the basis of the positioning signals from the positioning satellites, such as the positioning satellites 110 of FIG. 1, and on the basis of reference data received from a reference station or a reference station network, such as the reference station 120 of FIG. 1. The position determination is performed in certain time intervals on the basis of a set or epoch of positioning signals from the satellites, accompanied by corresponding reference data for the epoch of positioning signals. Obviously, as the above discussed error sources are time variant, the reference data should in view of the desired high accuracy only be used for the associated epoch of positioning signals. If the reference data is used for example at a later instance in time for a later received epoch positioning signals, the accuracy of the positioning determination deteriorates.

Moreover, the rover station performs a position determination also during times of an outage of the reference data of the reference station. In the case of such an outage of reference data, i.e. the unavailability of reference data associated with positioning signals received at a certain instance in time, i.e. a certain epoch of positioning signals, the rover station receives error data e.g. specifying satellite clock time drifts or time differences from the error data transmitter, such as error data transmitter 130 of FIG. 1. For example, the error data are such that the rover station is enabled to determine the time errors at the needed instances in time. For example, the error data may explicitly specify a precise clock at least one instance in time, clock errors at the instance in time or corrections of broadcast clocks in view of the precise satellite clock errors. In an alternative, the error information includes time deviations between two instances in time, so that the sum of all deviations between consecutive instances in time starting from a reference point in time with the absolute error known allows determination of the error at a current instance in time.

During an outage of the reference data the rover station performs a determination of a position of the rover station on the basis of positioning signals from the positioning satellites at the current instance in time, and the reference data previously received at the previous instance in time, and at least on the basis of the error data received at the current instance in time. Depending on the procedure to perform the estimation process, also error information at the previous instance in time may be used, such as information on clock errors at the previous and current instances in time.

More precisely, the rover station 100 includes a positioning signal receiver 210 to receive positioning signals for a first instance in time from each of a plurality of positioning satellites, such as the positioning satellites 110 of FIG. 1. Moreover, the rover station includes a reference data receiver 220 to receive reference data from at least one reference station for the first instance in time, and a positioning unit 251 to determine a position of the rover station for the first instance in time based on the positioning signals and the reference data.

The rover station also includes an outage detection unit 252 to detect an outage of the reference data from the at least one reference station and an error data receiver 230 is provided to receive for each of the satellite clocks of the plurality of positioning satellites error data specifying a corresponding satellite clock drift. Upon detecting an outage of the reference data, the positioning unit determines the position of the rover station for a second instance in time based on positioning signals for the second instance in time, the stored reference data for the first instance in time and the error data at the second instance in time.

In other words, during an outage of reference data from the reference station and the rover station performs a position determination based on currently received positioning signals, previously received reference data and, performs a correction of the position determination on the basis of the error data specifying the satellite clocks drift. As the error data includes information on a clock drift of each of the plurality of satellites needed for the position determination, the rover station is in the position of correcting the individual range determinations on the basis of the respective satellite clock drifts and thus can eliminate a corresponding positioning error.

Moreover, if the error data received from the error data transmitter also includes error data specifying orbit errors of the plurality of positioning satellites and/or information on a troposphere induced error, the rover station is also in the position of correcting the position determination on the basis of the additional error data.

The rover station may apply any other error correction as used in the art, such as means to correct a relativistic time error introduced by the orbits corresponding relative velocities of the positioning satellites with regard to the rover station. Moreover, an error caused by the ionosphere may be removed based on measurements in different frequencies (the L1 and L2 frequency). As the error introduced by the ionosphere is frequency dependent, a measurement on the basis of two frequencies can be used to eliminate the corresponding ionosphere error at the rover station.

In the following the individual elements of the rover station 100 are outlined in further detail. It is noted that the following contains example only and should not be construed as limiting the invention.

The rover station 100 may be any kind of position determining unit, e.g. a mobile unit, a hand held device or a positioning unit installed in a vehicle, such as a tractor for agricultural applications, vehicles on a construction site, vehicles, ships, airplanes, or any other vessels.

The rover station includes circuitry and/or processing elements for receiving positioning signals, reference data and error data. Preferably, the rover station includes at least one antenna for receiving the positioning signals from the satellites, the reference data from the reference station and the error data from the error data transmitter. Moreover, the rover station preferably includes circuitry and processing capabilities to convert or process the received signals, including down conversion, analog/digital conversion and similar. Accordingly, the positioning signal receiver 210, the reference data receiver 220 and the error data receiver 230 may be constituted by a hardware arrangement, cooperating with a processing element using applicable software or circuitry, including an ASIC (application specific integrated circuits). The receivers 210, 220 and 230 may be realized as individual units, as indicated in FIG. 2, however, may also be provided as a single processing unit interfacing with at least one antenna.

Moreover, it is conceivable that the receivers 210, 220 and 230 have wireline connections to external devices, the external devices providing the required positioning signals, the reference data and/or the error data. For example, while the positioning signals from the satellites may be directly received via an antenna, the reference data and/or the error data may be received via a wireline connection from further devices, e.g. onboard a vehicle, such as cellular telephones or any other device or equipment.

Moreover, while the receivers 210, 220 and 230 are shown as integral parts in FIG. 2 of the rover station 100, in another example the receivers are constituted by units external to the rover station 100.

Moreover, in an example the position determination unit 251 and the reference data outage detection unit 252 are provided by processing units and/or hardware arrangements for performing the position determining operations and detecting the outage of the reference data. In this example a processing unit associated with a memory 250 is provided, as shown in FIG. 2, integrating the position determining unit and the reference data outage detection unit.

The processing unit may be data processing unit executing instructions for performing the position determination and reference data outage detection on the basis of code sections stored in the memory. More precisely, the memory may store code sections that, when loaded into the processing unit, make the processing unit execute a determination of a position of the rover station for a first instance in time based on the positioning signals for the first instance in time and the reference data for the first instance in time, the detection of an outage of the reference data from the at least one reference station, obtain for each of the satellite clocks error data specifying a satellite clock drift, and to determine the position of the rover station for a second instance in time based on positioning signals for the second instance in time, the stored reference data for the first instance in time and the satellite clocks error data for the second instance in time.

Alternatively, the above operations may at least be integrated as hardware circuitry, such as by ASICs.

Still further, in an example the rover station includes a display for displaying relevant information such as a determined position and/or includes input unit for inputting commands, such as a keyboard or any other input unit. The rover unit may be provided with a control output for interfacing with further control units of a vehicle or similar, for outputting the determined position of the rover station for control purposes, to steer the vehicle along a predetermined and specified path.

In the following a further embodiment of the invention will be outlined with regard to FIG. 3.

Figure 3:
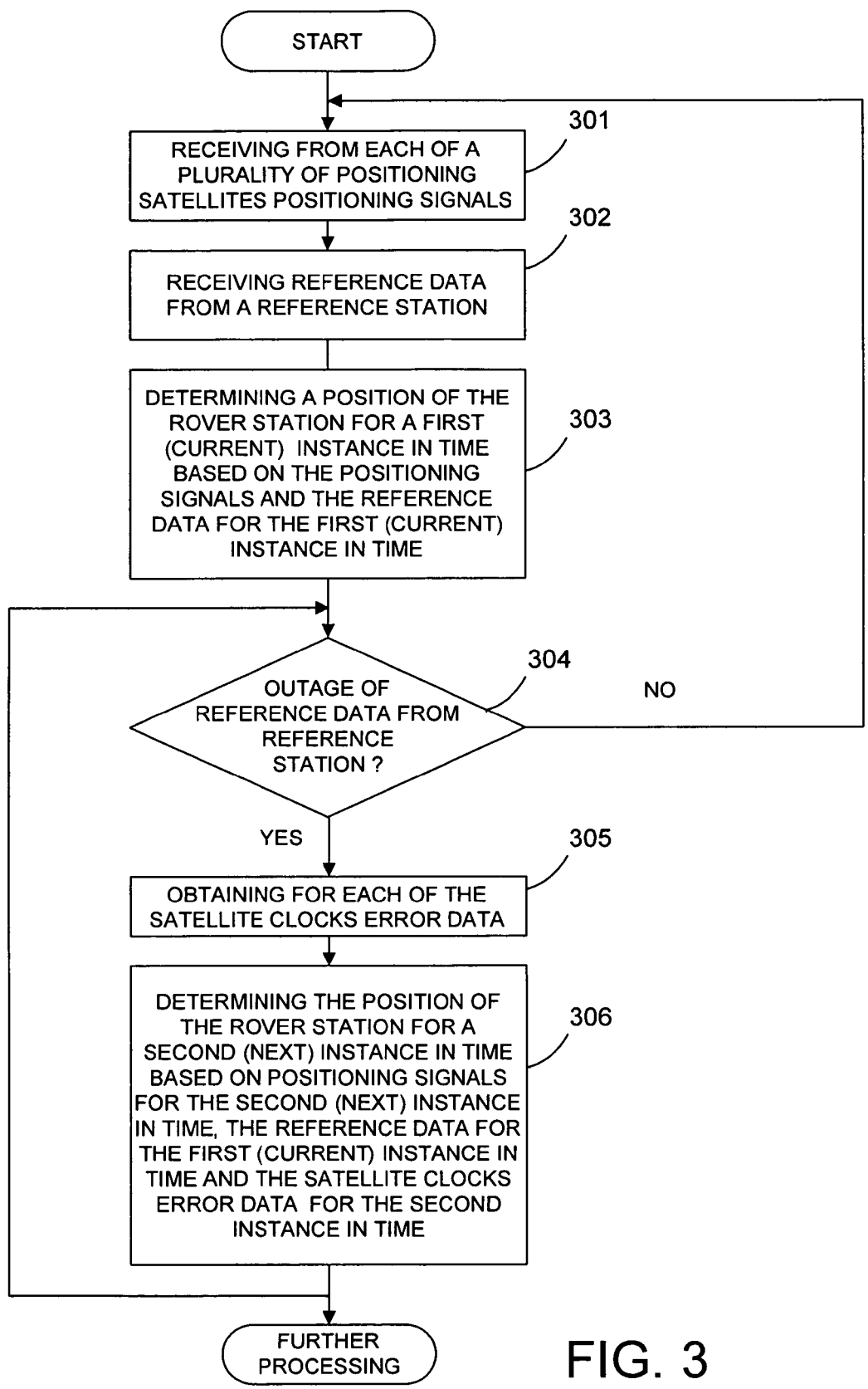
FIG. 3 illustrates operation of a method for determining a position of a rover station according to another embodiment of the invention.

FIG. 3 illustrates operations for determining a position at a rover station based on positioning signals from a plurality of satellites according to another embodiment of the invention. The operations of FIG. 3 may be carried out by a rover station such as shown in FIG. 2 and in the environment shown in FIG. 1, however, FIG. 3 is not limited thereto.

In a first operation 301 the rover station receives positioning signals from each of a plurality of positioning satellites, such as in any GNSS system. The positioning signals may be in the form and received according to any known standard, as noted above.

In an operation 302 the rover station receives reference data from a reference station or reference station network, such as shown in FIG. 1. The reference data may include observations made at a reference station, i.e. measurements made by the reference station that can be used by the rover station to correct errors in the position determination made on the basis of the positioning signals. In this connection the reference data may include measurements made by the reference station with regard to each of the plurality of satellites, or may include any combination or further processing result of these measurements. Alternatively or in addition thereto the reference data may include information on expected position detection errors at the rover station, including error models that enable the rover station to virtually shift the position determination results at the reference station to the rover station to be used for correction for still higher accuracy of the position determination. The reference data may also include a quantification of a position error, e.g. specified as an error in the position determination in terms of latitude, longitude and altitude.

It is noted that the reference data from the reference station or reference station network is affected by the error sources in a similar manner to the position determination at the rover station and thus, by using the measurements made at the reference station and by knowing the exact position of the reference station, the rover station can always correct its own measurements. While the reference data does not explicitly quantify each of the errors introduced by the error sources, such as range deviations caused by time drifts, the troposphere, orbit errors, ionosphere and relativistic errors and similar, the reference data transmitted from the reference station implicitly contains the individual errors in terms of the measurements made at the reference station. In order to use the reference data appropriately at the rover station it therefore must be known at the rover station if and in case which error sources have already been eliminated at the reference station and which error sources still have to be considered.

In one example an RTK positioning technique is used, including single difference techniques, building a difference between measurements to different satellites and/or by different receivers, as well as double difference techniques. Single difference techniques processing subtracts reference data from the rover data cancel out most of the above discussed errors. In single difference techniques a receiver clock error remains in the observations at the rover station and can be modeled in a position filter using known techniques, such as in a Kalman filter, as known in the art. Observations made on the basis of single difference techniques still contains differential receiver biases, differential atmospheric errors, differential receiver clock errors, differential orbit errors and differential noise. Moreover, double differencing techniques are used to cancel out also the receiver clock errors. Observations performed according to double difference techniques include still the differential atmospheric errors, differential orbit errors and differential noise.

Reference data received are applied to the rover data as outlined above. It is noted that on transmitting reference data, some known terms such as geometric range, broadcast satellite clock error and relativistic correction as well as a rough estimate of the receiver clock error may be removed from raw observations or reference data to get a smaller value range for transmission over a band with limited data link. In this case, however, it must be known at the rover station exactly which corrections, except the receiver clock error, have been applied.

In an operation 303 the rover station determines a position of the rover station for a first instance in time based on positioning signals for the first instance in time and the reference data for the first instance in time;

In an operation 304 the rover station determines whether an outage of the reference data from the reference station occurred. The outage of the reference data includes a complete unavailability of the reference data or reference data that is corrupted to such an extent that it cannot be properly used at the rover station for enhancing the position determination results. Accordingly, the detection on an outage of the reference data may include determining the usability of received reference data or the entire absence of reference data, for example if the rover station is in a area shadowed by mountains, buildings, etc. The outage may be detected by a processing unit of the rover station determining that the reference data is not available at all or is of insufficient quality to be used for correcting the position determination result.

If in operation 304 the decision is NO, i.e. if no outage occurred, the flow of operations returns to operation 301 and a position of a next instance in time is determined in operations 302 and 303.

If in operation 304 the decision is YES, i.e. if an outage occurred, in an operation 305 the rover station obtains for each of the satellites clocks error data specifying at least a satellite clock drift, i.e. error from the true or system time. The clock drifts may in particular include random variations that need to be accounted for. As noted above, each of the positioning satellites used includes highly accurate clocks that, however, still suffer from slow random clock drifts that have an influence on the positioning result. The satellite clocks error data may be received via a separate radio link, for example from an alternate satellite, or via a terrestrial radio link from any kind of error data transmitter, such as the error data transmitter 130 of FIG. 1. Additionally, also the positioning satellites themselves may serve as error data transmitter for transmitting the satellite clocks error data to the rover station. It is noted that the rover unit may not only receive the satellite clocks error data upon detecting an outage of the reference data, but may continuously or in intervals receive error data, and may hold or discard this information.

In an operation 306, if the outage of the reference data from the reference station is detected, the position of the rover station for a second instance in time is determined based on positioning signals for the second instance in time, the reference data for the first instance in time and the error data including at least the satellite clock drifts for the second instance in time. In other words, in operation 306 the rover station performs a position determination in the absence of reference data for a current point in time on the basis of positioning signals for the current point in time, the reference data for a previous point in time and the satellite clocks error data for the current point in time, e.g. specifying a time difference between a first instance in time and a second instance in time can be used.

With the satellite clock drifts at the individual positioning satellites known at the rover station, the rover station may eliminate associated errors in the range determination on the basis of the positioning signals, e.g., for each satellite the rover station can correct the determined range value on the basis of the satellite clocks drift. Also, the clock drifts may be applied to the positioning result on the basis of a so called error model that models the influence of the drift onto the positioning result, e.g. on the basis of a functional interrelation.

After operation 306 the flow may return to operation 304 and is determined, whether the outage is still present. If the decision is YES, a position at a next instance in time can be estimated based on error data at the next instance in time, the positioning signals from the satellites at the next instance in time and the "old" reference data of the first instance in time.

Moreover, following operation 306 the position determination may use time-based filtering techniques for further improving the positioning result based on a sequence of position determination results, such as a Kalman filter, as known in the art.

It is noted that besides error data specifying a satellite clock drift at the individual positioning satellites, further information on clock errors of the satellite clocks may be included, such as an absolute deviation of the satellite clocks from the reference time. Moreover, the error data received at the rover station may include information on an orbit error, troposphere inferred errors, and similar, such as outlined above. If information on the further error sources is also known at the rover station, corresponding measurements to correct the associated errors can be taken at the rover station, i.e., range measurements to the individual satellites can be corrected on the basis of the additional error data.

In the following a further embodiment of the invention will be outlined with regard to FIG. 4.

Figure 4:
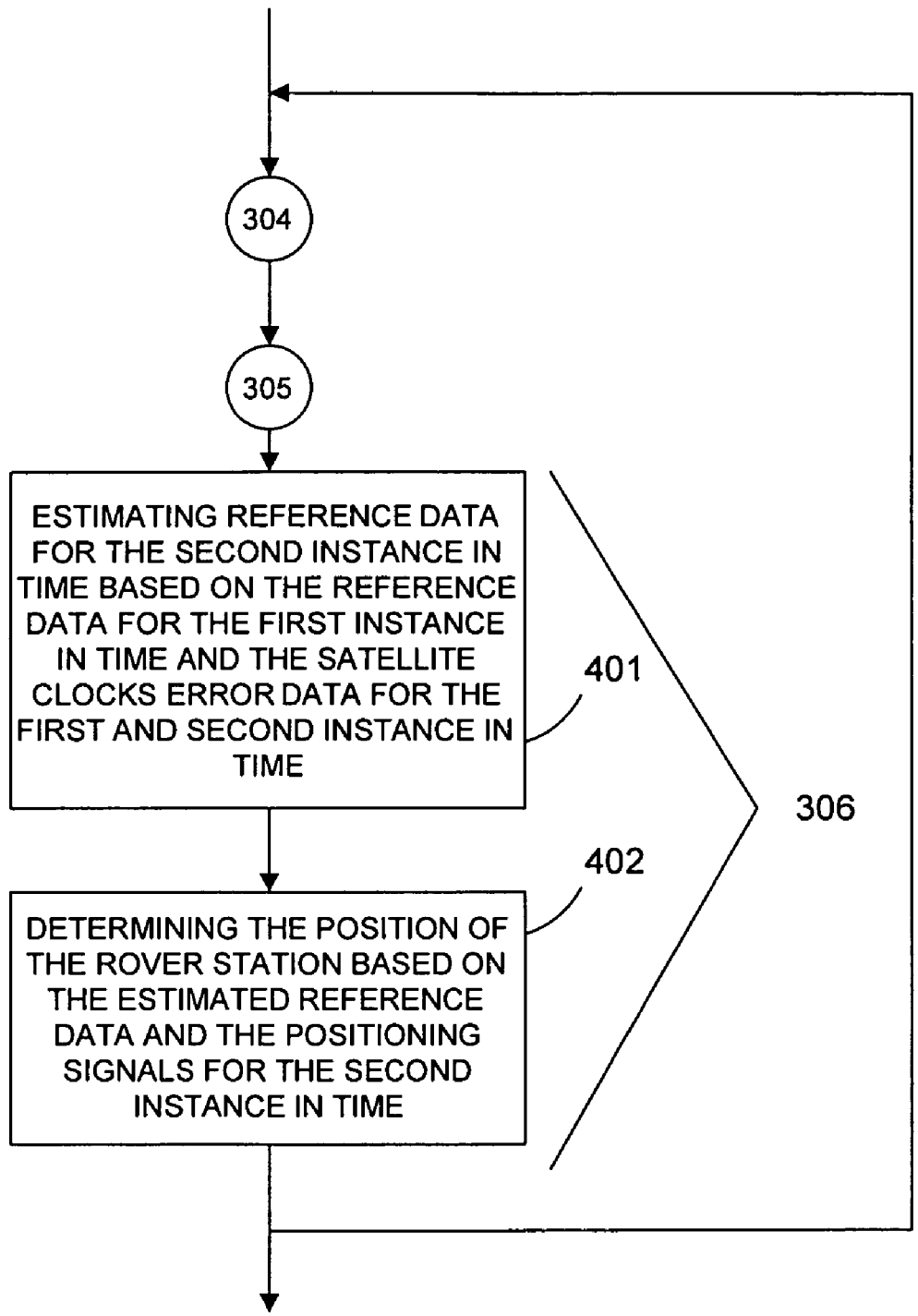
FIG. 4 illustrates operations of a method for determining a position of a rover station according to another embodiment of the invention, particularly illustrating operations for estimating reference data.

FIG. 4 illustrates operations of a method for determining a position of a rover station upon an outage of reference data from a reference station according to another embodiment of the invention, particularly illustrating operations for propagating reference data in time based on the error data.

As noted above, the satellite clocks error data is used to eliminate errors associated with satellite clocks drifts in the measurement results at the rover station. According to the present embodiment, the satellite clocks errors are used to estimate reference data at a current instance in time based on the reference data at a previous instance in time and information on the satellite clock error at the current instance in time and the previous instance in time. Accordingly, if the outage of the reference data is detected, the satellite clock drifts are used to estimate the reference data at future points in time based on previous reference data and such obtained reference data are treated in the position determination as if they were the currently received reference data.

More precisely, following operations 304 and 305 of FIG. 3, including determining the outage and obtaining satellite clocks error data specifying the satellite clocks drift for each of the positioning satellites, in an operation 401 the reference data for the second instance in time is modified based on the reference data for the first instance in time and the satellite clocks error data for the first and second instances in time.

Propagating the reference data of the previous instance in time is an iterative process that may be applied repeatedly, i.e., estimated reference data based on satellite clocks drifts may be used in a further step to calculate reference data at a subsequent points in time based on subsequent satellite clock error information. Also, the clock errors may be applied to the reference data on the basis of a so called error model that models the influence of the drift onto the reference data, e.g. on the basis of a functional interrelation.

As shown below, reference propagation may include propagating the reference data from an original time tag to a propagated time tag which may be a current rover tag.

This formula propagates the reference data from its original time tag to a propagated time tag which usually is the rover time tag at a current instance in time.

$$\Phi p_{rev}^{sv}(t,tp) = \Phi c_{rev}^{sv}(t) + bc^{sv}(t) - bc^{sv}(tp)$$

In an operation 402, after estimating the reference data for the second instance in time based on the reference data for the first instance in time and the satellite clocks error data for the first instance in time and the second instance in time, the position of the rover station is determined based on the estimated reference data for the second instance in time and the positioning signals for the second instance in time. Thus, the propagated reference data can be applied as if the estimated reference data were the reference data applicable and received for the second instance in time, such as in operation 303 above. This procedure for estimating a position bears the advantage that only the reference data received from the reference station is propagated to subsequent instances in time, without the need to alter the remaining determination process for obtaining a position of the rover station, if reference data were available.

The reference data at the propagated time tag is then used in the same way as the original reference data would be used in normal double difference processing:

$$\Phi c_{rov}^{sv}(t2) - \Phi c_{rov}^{rsv}(t2) - (\Phi p_{ref}^{sv}(t1,t2) - \Phi p_{ref}^{rsv}(t1,t2))$$

The observation contains the time differences of the broadcast corrections and atmospheric errors.

Operations 401 and 402 together may be integrated into the flow chart of FIG. 3, operation 306. After operation 402 the flow may return to operation 304 and a position at a next instance in time can be estimated based on error data at the next instance in time, the positioning signals from the satellites at the next instance in time and the propagated reference data obtained in operation 401. Based on this procedure a position can be estimated also during longer outages of the reference data.

In the following a further embodiment of the invention will be disclosed with regard to FIG. 5.

Figure 5:
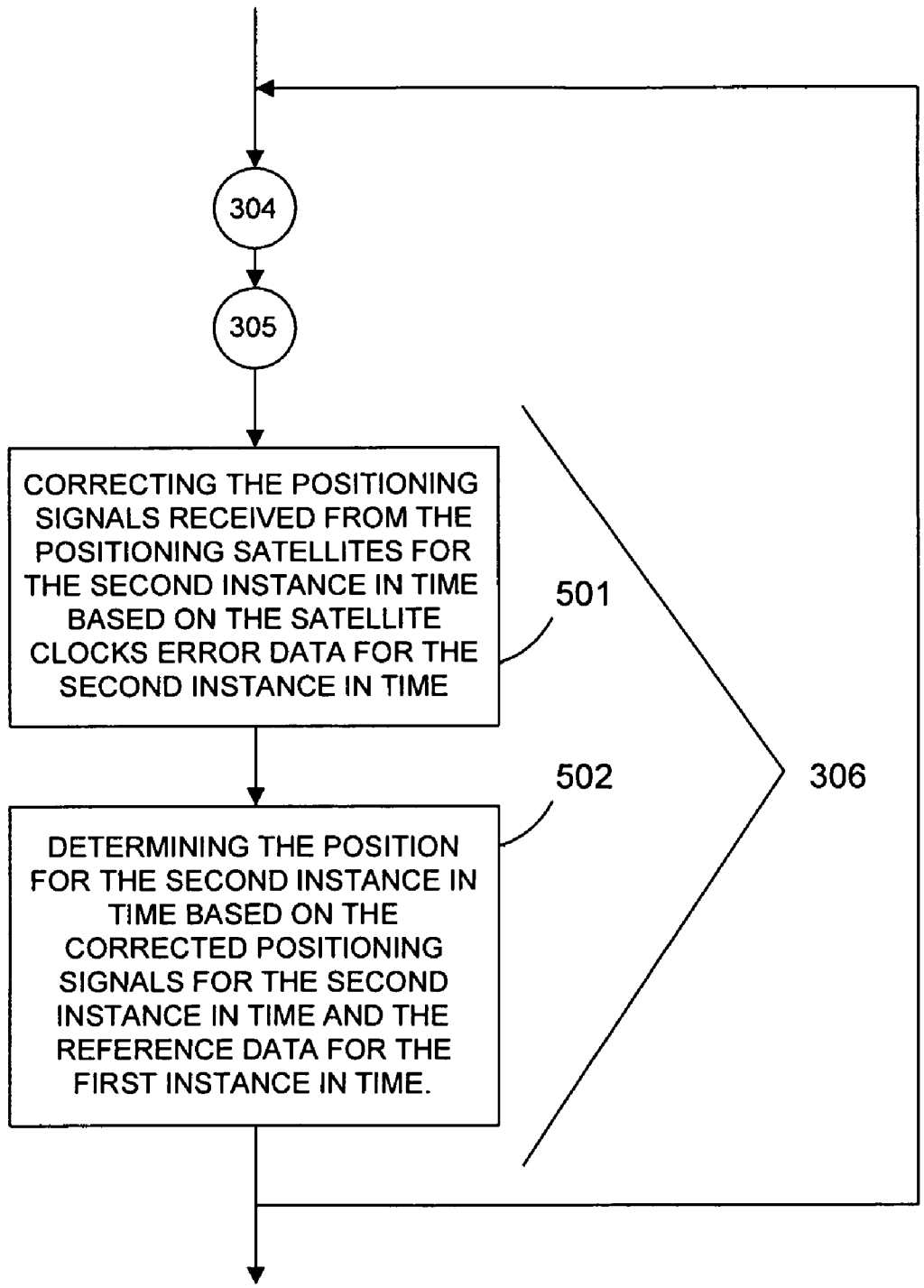
FIG. 5 illustrates operations of a method for determining a position of a rover station according to another embodiment of the invention, particularly illustrating operations for correcting positioning signals based on satellite clock's error data.

FIG. 5 illustrates operations of a method for determining a position of a rover station based on positioning signals from a plurality of satellites according to another embodiment of the invention, particularly illustrating determining a position during an outage of reference data by applying the error data to the positioning signals, as opposed to the reference data as in the embodiment with regard to FIG. 4. In particular, while in the embodiment of FIG. 4 the satellite clocks reference data was applied to propagate the reference data to subsequent points in time, the current embodiment applies the satellite clocks error data received at a certain instance in time to the positioning signals received at this instance in time. In other words, according to the present embodiment the positioning signals or a position determination result based thereon are corrected on the basis of the error data at least including the satellite clocks error or any additional error data included in the error data received from the error data transmitter, before applying the last received reference data as it is without further modification to position determination process.

More precisely, following operations 304 and 305, including determining the outage and obtaining satellite clocks error data specifying the satellite clocks drift for each of the positioning satellites, in an operation 501 the positioning signals received from the positioning satellite including intermediate results there from are corrected based on the satellite clocks error data. Accordingly, the position signals for the second instance in time are corrected on the basis of the satellite clocks error data for the second instance in time. Then, in an operation 502 the position of the rover station for the second instance in time is determined based on the corrected positioning signals for the second instance in time and the corrected reference data for the first instance in time. Also, the clock drifts may be applied to the position determination on the basis of a so called error model that models the influence of the drift onto the position determination, e.g. on the basis of a functional interrelation.

In other words, with operations 501 and 502 that may be included in operation 306 of FIG. 3, first the positioning signals for a current instance in time are corrected based on the satellite clocks error data for the current instance in time and the position for the current instance in time is determined based on the corrected positioning signal for the second instance in time and the reference data for the previous instance in time, e.g. the last correctly received reference data from the reference station.

After operation 502 the flow may return to operation 304 and a position at a next instance in time can be estimated based on error data at the next instance in time, the positioning signals from the satellites at the next instance in time and the reference data of the first instance in time. Based on this procedure, a position can be estimated also during longer outages of the reference data.

According to this embodiment information on the satellite clocks drift is directly applied to the positioning signals, before further processing based on the last available reference data is performed.

In an example, positioning with corrected positioning signals at the rover station may be performed as detailed below. In this alternative all available satellite corrections are applied. This is done with the rover time tag for the rover data and with the reference time tag for the reference data.

$$\Phi c_{rov}^{sv}(t2)+bc^{sv}(t2)-(\Phi c_{rov}^{rsv}(t2)+bc^{rsv}(t2))-(\Phi c_{ref}^{sv}(t1)+bc^{sv}(t1)-(\Phi c_{ref}^{rsv}(t1)+bc^{sv}(t1)))$$

In the following a further embodiment of the invention is outlined with regard to FIG. 6.

Figure 6:
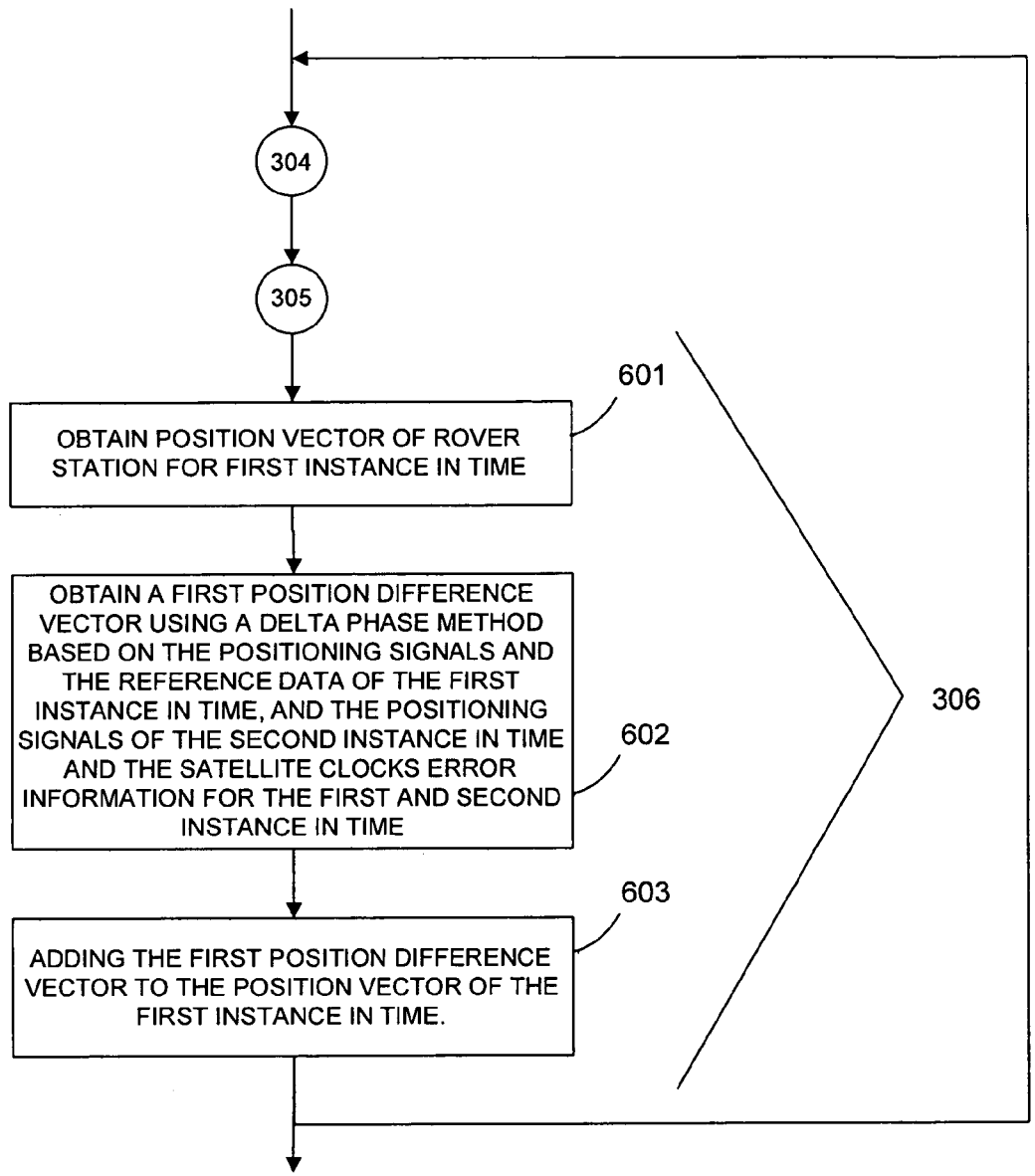
FIG. 6 illustrates operations of a method for determining a position of a rover station according to another embodiment of the invention, particularly illustrating operations for estimating a position based on a delta phase.

FIG. 6 illustrates operations for determining a position according to another embodiment of the invention, particularly illustrating operations for employing error data in a delta phase estimation process.

Delta phase measurement techniques include a time relative processing of the phase difference, utilizing measurements which span previous and current instances in a time the expression "Δ phase" or "delta phase" in this connection refers to a change in the measured carrier phase of a signal received from a positioning satellite, such as in a RTK system. Accordingly, delta phase methods as known in the art estimate phase changes between different instances in time relating to the positioning signals received from each of the satellites.

Examples for the determination of positions based on carrier phases can be found in "Global Positioning System: Signals, Measurements, and Performance", Second Edition (2006) by Pratap Misra and Per Enge, ISBN 0-9709544-1-7, Ganga-Jamuna Press P.O. Box 692 Lincoln, Mass. 01773, particularly in chapters 5 and 6, describing positioning in general, which includes delta phase if using the right observable (time differenced phase). A description of delta phase methods can be found in "New Positioning Filter: Phase Smoothing in the Position Domain", Tom Ford and Jason Hamilton, NovAtel Inc. Meeting: Proceedings of the 15th International Technical Meeting of the Satellite Division of the Institute of Navigation ION GPS 2002, Sep. 24-27, 2002, Oregon Convention Center, Portland, Oreg., pages 1850-1862.

In the present embodiment, following operations 304 and 305, including determining the outage and obtaining satellite clocks error data specifying the satellite clocks drift for each of the positioning satellites, in an operation 601 a position vector of the rover station for the first instance in time is obtained. The position vector may be specified in terms of Cartesian coordinates or in terms of longitude, altitude and latitude, or in any other coordinate system or may be specified in terms of ranges to the individual positioning satellites from the rover station.

Determination of the position vector for the first instance in time preferably is as accurate as possible on the basis of available reference data in order to avoid a deterioration of the position estimation during the outage of reference data.

In an operation 602 then a first position difference vector is obtained using the delta phase method based on the positioning signals and the reference data of the first instance in time, and the positioning signals of the second instance in time and the satellite clocks error data of the second instance in time. Accordingly, in operation 602 the positioning signals and the reference data of a previous instance in time having reference data available in association therewith are used, and a position difference vector is determined based on the positioning signals of the second instance in time and the satellite clocks error data of the first and second instance in time.

In an operation 603 the first position difference vector is added to the position vector of the first instance in time to obtain an estimate of the current position vector of the rover station.

After operation 603 the flow may return to operation 304 and a position at a next instance in time can be estimated based on the position of the second instance in time and a new position difference vector obtained in operation 602 by obtaining a next position difference vector using the delta phase method based on the positioning signals of the second instance in time and the reference data of the first instance in time, and the positioning signals of the next instance in time and the satellite clocks error information of the present and next instance in time. Based on this procedure, a position can be estimated also during longer outages of the reference data.

Accordingly, in this embodiment the rover station obtains, with the positioning unit for determining the position of the rover station at the second instance in time, a position vector of the rover station for the first instance in time and obtains a first position difference vector using a delta phase method, e.g. using a phase difference between the positioning signals at the first instance in time and at the second instance in time, and based on the positioning signals and the reference data of the first instance in time, and the positioning signals of the second instance in time and the satellite clocks error data at the first and second instance in time. Then, the positioning unit adds the first position difference vector to the position vector of the first instance in time.

A positioning in accordance with the delta phase method in the current embodiment may be expressed as follows:

$$\Delta\Phi_{rov,ref}^{sv,rsv}(t1,t2)=\Phi f_{rov}^{sv}(t2)-\Phi f_{rov}^{rsv}(t2)-(\Phi f_{rov}^{sv}(t1)-\Phi f_{rov}^{rsv}(t1))$$

Applying the delta phase to the first absolute positioning result reads as:

$$\Delta\Phi_{rov,ref}^{sv,rsv}(t1,t2)+\Phi c_{rov,ref}^{sv,rsv}(t1)$$

In brief, to bridge longer reference data outages, the delta phase technique is applied using a last epoch of positioning signals that had reference data available and current positioning signals. The resulting vector is added to a double difference positioning result of the first instance in time or any other precise position available like a benchmark on the ground.

In the following, a further embodiment of the invention will be described with regard to FIG. 7.

Figure 7:
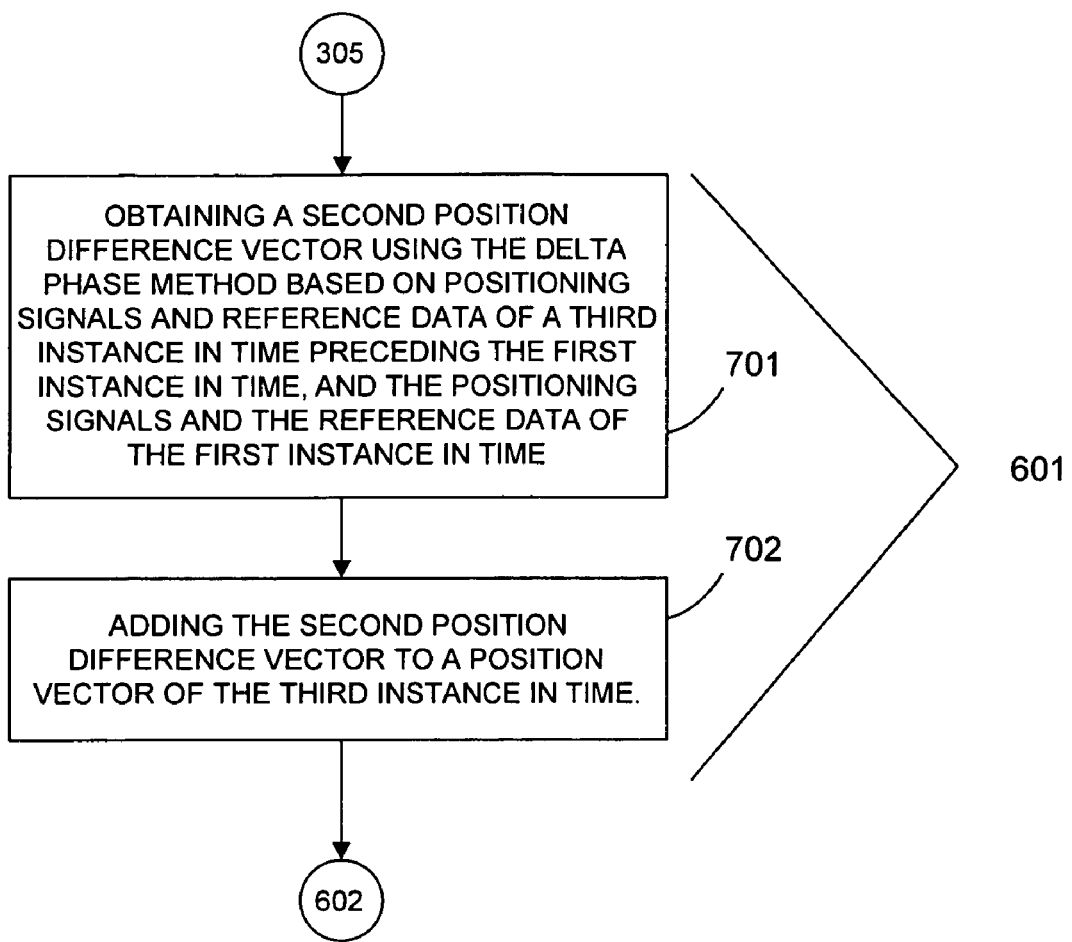
FIG. 7 illustrates operations of a method for determining a position of a rover station according to another embodiment of the invention, particularly illustrating operations for estimating a position based on the delta phase method.

FIG. 7 illustrates operations for determining a position as shown in FIG. 6 according to another embodiment of the invention, particularly outlining of delta phase estimation to a previous set of positioning signals, in which the delta phase method is applied to the two last instances at which reference data was available.

In accordance with the present embodiment, following e.g. an operation 305 of FIG. 3, in an operation 701 a second position difference vector is obtained using the delta phase method based on positioning signals and reference data of a third instance in time preceding the first instance in time, and the positioning signals and the reference data of the first instance in time. Accordingly, the first instance in time constitutes the last instance in time with reference information available, and the third instance in time constitutes an instance in time preceding this last instance in time with reference data available, and a position difference vector is obtained on the basis of the data at these points in time.

The second position difference vector obtained in operation 701 is then added to the position vector of the third instance in time.

Operation 702 may be followed by operation 602, continuing with obtaining the first position difference vector using the delta phase method.

It is an advantage in the presence of longer data outages to use the embodiment as outlined with regard to FIG. 7. In this case the number of satellites that have a cycle slip between two consecutive epochs of rover data is less than the number of cycle slips (and rising/setting satellites) for an extended time span of data. The position increments are added up in this embodiment, so that the position estimate for the full time span is the sum of the deltas computed for every consecutive determination.

In the following a further embodiment of the invention will be described with regard to FIG. 8.

Figure 8:
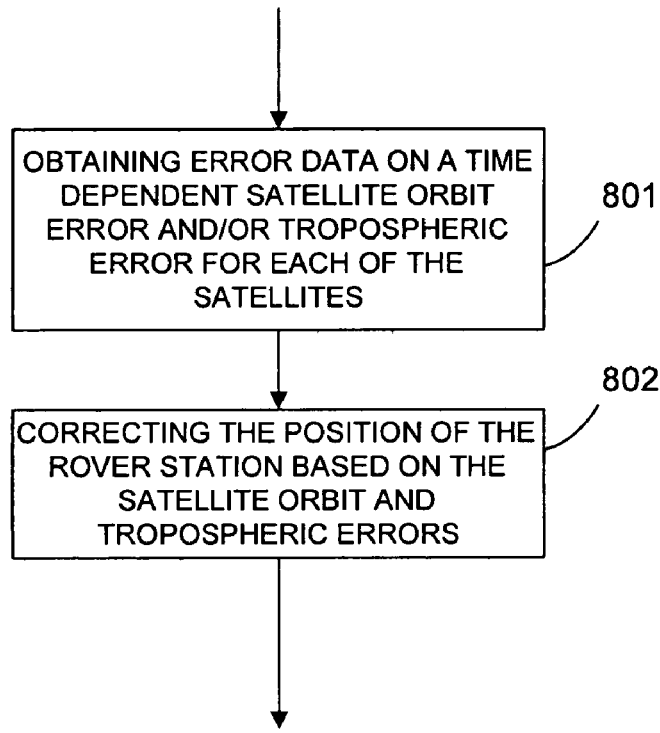
FIG. 8 illustrates operations of a method for determining a position of a rover station according to another embodiment of the invention, particularly illustrating operations for considering time dependent relativistic clock errors.

FIG. 8 illustrates operations for determining a position of a rover station according to an embodiment of the invention, particularly illustrating consideration of further error sources.

It was noted above that a satellite clocks drift accounts for a large portion of an error in a position determination for example in an RTK system, if reference data is unavailable. The satellite clocks drift therefore is transmitted from an error transmitter and considered at the rover station in the position determination during absences of the reference data.

However, not only an error associated with the satellite clocks drifts influences the accuracy of a positioning result, although other factors negatively influence an position accuracy during times of information outage. For example, a position determination always is performed on the basis of an assumed orbit position of a satellite. Obviously, if an actual orbit of a positioning satellite differs from an expected orbit, any time of flight/range calculation suffers from an associated error. A satellite orbit error can be quantified at a reference station or reference station network on the basis of its known positions with regard to the particular positioning satellites.

Moreover, it was briefly noted above, that the earth troposphere influences the propagation of positioning signals from the positioning satellite to the rover station. Transmission deviations introduced by the troposphere translate into a positioning inaccuracy or error when determining a position at the rover station. As it is the error introduced by the troposphere is frequency independent, it cannot be resolved at the rover station itself, unlike influences on the transmission of radio signals from the positioning satellites introduced by the ionosphere, which are frequency dependent and can be removed by making measurements in different frequencies (L1 and L2).

Accordingly, in the embodiment with regard to FIG. 8 the further error sources including satellite orbit errors and troposphere errors are considered for improving the position estimation at the rover station upon detecting an outage of the reference data.

More precisely, in an operation 801 error data on a time dependent satellite orbit error and/or a troposphere error for each of the satellites is obtained at the rover station, e.g. from the error data transmitter 130 of FIG. 1. For example, the position errors based on the true positions of the satellites and the expected satellite orbits may be determined at the reference station and included into the error data as position differences, e.g. position difference vectors between the true and expected positions, or in terms of the true positions of the satellites, as the satellite orbits are known at the rover station.

Moreover, error data specifying the influence of the troposphere may be quantified at the reference station and included in the error data transmitted from the error data transmitter 130 of FIG. 1 to the rover station. The corresponding error data may for example specify propagation delays introduced by the troposphere.

Subsequently, in an operation 802 the position determination process at the rover station is performed also on the basis of the error data informing on the troposphere influence and orbit errors, equivalent to the consideration of the satellite clocks drifts as outlined with regard to the previous embodiments, e.g. in FIGS. 3-7.

Accordingly, in accordance with the embodiment of FIG. 8, major error sources in the absence of reference data from the reference station can be eliminated and a highly accurate positioning estimation can be obtained.

Accordingly, the position determining in an example includes receiving positioning signals from each of a plurality of positioning satellites, receiving reference data from at least one reference station, determining a position of the rover station for a first instance in time based on positioning signals for the first instance in time and the reference data for the first instance in time, detecting an outage of the reference data from the at least one reference station, obtaining second error data specifying orbit errors of the plurality of positioning satellites and an error introduced by the troposphere clock drift, determining the position of the rover station for a second instance in time based on positioning signals for the second instance in time, the reference data for the first instance in time and the second error data for the second instance in time.

The position of the rover station for the second instance in time may be determined by determining reference data for the second instance in time based on the reference data for the first instance in time and the second error data; and by determining the position of the rover station for the second instance in time based on the estimated reference data and the positioning signals for the second instance in time.

Moreover, in this embodiment the position of the rover station for the second instance in time may be determined by correcting the positioning signals received from the positioning satellites for the second instance in time based on the second error data; and by determining the position for the second instance in time based on the corrected positioning signals for the second instance in time and the reference data for the first instance in time.

Still further, the position of the rover station for the second instance in time may be determined by obtaining a position vector of the rover station for the first instance in time; obtaining a first position difference vector using a delta phase method based on the positioning signals and the reference data of the first instance in time, and the positioning signals of the second instance in time and the second error data of the second instance in time; and by adding the first position difference vector to the position vector of the first instance in time.

Still further obtaining the position vector of the rover station for the first instance in time may include obtaining a second position difference vector using the delta phase method based on positioning signals and reference data of a third instance in time preceding the first instance in time, and the positioning signals and the reference data of the first instance in time; and by adding the second position difference vector to a position vector of the third instance in time.

Accordingly, not only satellite clocks drifts but also further error data may be considered upon detection of a outage of reference data.

Figure 9:
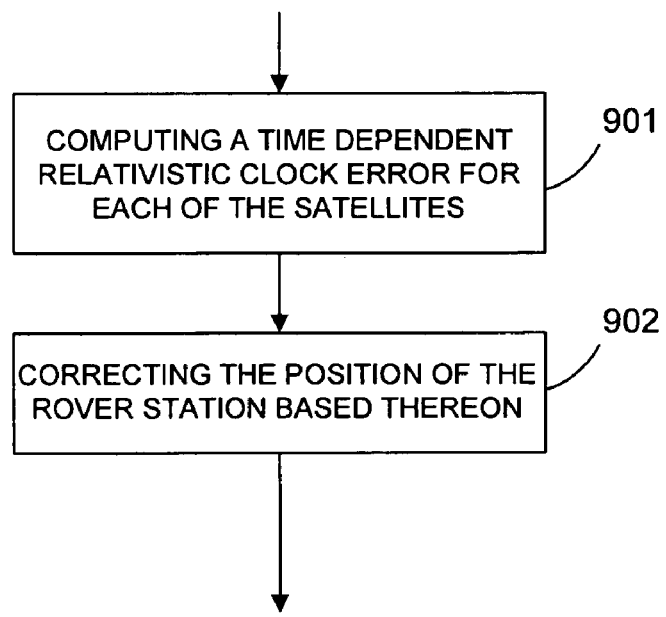
FIG. 9 illustrates operations of a method for determining a position of a rover station according to another embodiment of the invention, particularly illustrating operations for considering a time dependent satellite orbit error.

In the following a further embodiment of the invention will be disclosed with regard to FIG. 9. FIG. 9 illustrates operations for determining a position of a rover station based on positioning signals from positioning satellites, particularly illustrating consideration of a relativistic clock error for the satellites.

In a GNSS system, the positioning satellites orbit the earth in approximately 20,000 kilometers of altitude. The elliptic nature of the satellite orbit leads to the introduction of relativistic effects in the position determination. In normal position determination, i.e. on the basis of positioning signals from the plurality of satellites and on the basis of reference data from the reference station, the relativistic effects cancel out and thus need not to be considered, however, in the absence of reference data from the reference station relativistic effects are not eliminated and need separate attention.

Accordingly, in the embodiment of FIG. 9, in an operation 901 a time dependent relativistic clock error is computed at the rover station for each of the satellites based on the available orbit information and the position of the rover station and the associated relative velocity between the satellite and the rover station.

Subsequently, in an operation 902 the position determination process is corrected on the basis of the relativistic clock errors determined.

Accordingly, in this embodiment relativistic effects are considered in addition to the error data received from the error data transmitter during times of an outage of reference data of the reference station.

According to another embodiment, a rover station for position determination based on positioning signals of a plurality of positioning satellites includes a positioning signal receiver receiving positioning signals from each of a plurality of positioning satellites; a reference data receiver receiving reference data from at least one reference station; an error data receiver receiving for each of the satellite clocks error data specifying a satellite clock drift; a processing unit 250 associated with a memory unit storing code sections that, when loaded make the processing unit determining a position of the rover station for a first instance in time based on positioning signals for the first instance in time and the reference data for the first instance in time; detect an outage of the reference data from the at least one reference station; and determine the position of the rover station for a second instance in time based on positioning signals for the second instance in time, the reference data for the first instance in time and the satellite clocks error data for the second instance in time.

Moreover, the memory may store code sections to determine reference data for the second instance in time based on the reference data for the first instance in time and the satellite clocks error data; and determine the position of the rover station for the second instance in time based on the estimated reference data and the positioning signals for the second instance in time.

Moreover, the memory may store code sections for determining the position of the rover station at the second instance in time, including code sections to correct the positioning signals received from the positioning satellites for the second instance in time based on the satellite clocks error data; and determine the position for the second instance in time based on the corrected positioning signals for the second instance in time and the reference data for the first instance in time.

Moreover, the memory may store code sections for determining the position of the rover station at the second instance in time, including code sections to obtain a position vector of the rover station for the first instance in time; obtain a first position difference vector using a delta phase method based on the positioning signals and the reference data of the first instance in time, and the positioning signals of the second instance in time and the satellite clocks error data; and add the first position difference vector to the position vector of the first instance in time.

Moreover, the memory may store code sections for determining the position of the rover station at the second instance in time, including code sections to obtain a second position difference vector using the delta phase method based on positioning signals and reference data of a third instance in time preceding the first instance in time, and the positioning signals and the reference data of the first instance in time; and add the second position difference vector to a position vector of the third instance in time.

Moreover, the memory may store code sections for determining the position of the rover station at the second instance in time by obtaining at least one of a time dependent satellite orbit error and troposphere error for each of the satellites and correcting the position of the rover station based on the satellite orbit and troposphere errors.

A program may be provided including instructions adapted to cause the data processing unit to carry out the operations of the above embodiments. Moreover, a computer readable medium may embody the program. Finally, a computer program product may comprise the computer readable medium.

The invention claimed is:

1. A rover station for determining a position, the rover station including:
   a positioning signal receiver to receive positioning signals from each of a plurality of positioning satellites;
   a reference data receiver to receive reference data from at least one reference station;
   a positioning unit to determine a position of the rover station for a first instance in time based on positioning signals for the first instance in time and the reference data for the first instance in time;
   an outage detection unit to detect an outage of the reference data from the at least one reference station; and
   an error data receiver to receive for each of the satellite clocks error data specifying a satellite clock drift;

wherein the positioning unit is adapted to determine the position of the rover station for a second instance in time based on positioning signals for the second instance in time, the reference data for the first instance in time and the satellite clocks error data at least for the second instance in time.

2. The rover station of claim 1, wherein the positioning unit, for determining the position of the rover station at the second instance in time, is adapted to:
determine reference data for the second instance in time based on the reference data for the first instance in time and the satellite clocks error data; and
determine the position of the rover station for the second instance in time based on the estimated reference data and the positioning signals for the second instance in time.

3. The rover station of claim 1, wherein the positioning unit, for determining the position of the rover station at the second instance in time, is adapted to:
correct the positioning signals received from the positioning satellites for the second instance in time based on the satellite clocks error data; and
determine the position for the second instance in time based on the corrected positioning signals for the second instance in time and the reference data for the first instance in time.

4. The rover station of claim 1, wherein the positioning unit, for determining the position of the rover station at the second instance in time, is adapted to:
obtain a position vector of the rover station for the first instance in time;
obtain a first position difference vector using a delta phase method based on the positioning signals and the reference data of the first instance in time, and the positioning signals of the second instance in time and the satellite clocks error data; and
add the first position difference vector to the position vector of the first instance in time.

5. The rover station of claim 4, wherein the positioning unit, for determining the position of the rover station at the second instance in time, is adapted to:
obtain a second position difference vector using the delta phase method based on positioning signals and reference data of a third instance in time preceding the first instance in time, and the positioning signals and the reference data of the first instance in time; and
add the second position difference vector to a position vector of the third instance in time.

6. The rover station of claim 1, wherein the reference data includes at least one of:
range corrections for each of the plurality of satellites; and
raw observations at the at least one reference station.

7. The rover station of claim 1, wherein the error data receiver is adapted to receive the clock error data from at least one of:
the plurality of positioning satellites;
an alternate satellite source; and
a ground based station via wireline or wireless communications.

8. The rover station of claim 1, wherein the error data receiver is adapted to receive the clock error data at predetermined time intervals over a low bandwidth link.

9. The rover station of claim 1, wherein the positioning unit is arranged to obtain at least one of a time dependent satellite orbit error and troposphere error for each of the satellites and to correct the position of the rover station based on the satellite orbit and troposphere errors.

10. The rover station of claim 1, wherein the positioning unit is arranged to obtain a time dependent relativistic clock error for each of the satellites and to correct the position of the rover station based thereon.

11. A position determining method, the method including:
receiving positioning signals from each of a plurality of positioning satellites;
receiving reference data from at least one reference station;
determining a position of the rover station for a first instance in time based on positioning signals for the first instance in time and the reference data for the first instance in time;
detecting an outage of the reference data from the at least one reference station;
obtaining for each of the satellite clocks error data specifying a satellite clock drift; and
determining the position of the rover station for a second instance in time based on positioning signals for the second instance in time, the reference data for the first instance in time and the satellite clocks error data at least for the second instance in time.

12. The method of claim 11, wherein the position of the rover station for the second instance in time is determined by:
determining reference data for the second instance in time based on the reference data for the first instance in time and the satellite clocks error data; and
determining the position of the rover station for the second instance in time based on the estimated reference data and the positioning signals for the second instance in time.

13. The method of claim 11, wherein the position of the rover station for the second instance in time is determined by:
correcting the positioning signals received from the positioning satellites for the second instance in time based on the satellite clocks error data; and
determining the position for the second instance in time based on the corrected positioning signals for the second instance in time and the reference data for the first instance in time.

14. The method of claim 11, wherein the position of the rover station for the second instance in time is determined by:
obtaining a position vector of the rover station for the first instance in time;
obtaining a first position difference vector using a delta phase method based on the positioning signals and the reference data of the first instance in time, and the positioning signals of the second instance in time and the satellite clocks error data; and
adding the first position difference vector to the position vector of the first instance in time.

15. The method of claim 14, wherein obtaining the position vector of the rover station for the first instance in time includes:
obtaining a second position difference vector using the delta phase method based on positioning signals and reference data of a third instance in time preceding the first instance in time, and the positioning signals and the reference data of the first instance in time; and
adding the second position difference vector to a position vector of the third instance in time.

16. The method of claim 11, wherein the reference data includes at least one of:
range corrections for each of the plurality of satellites, and
raw observations at the at least one reference station.

17. The method of claim 11, wherein the clock error data is received from at least one of:
the plurality of positioning satellites;

another satellite; and a ground based station via wireline or wireless communications.

18. The method of claim 11, wherein the clock error data is obtained at predetermined time intervals over a low bandwidth link.

19. The method of claim 11, including obtaining at least one of a time dependent satellite orbit error and troposphere error for each of the satellites and correcting the position of the rover station based on the satellite orbit and troposphere errors.

20. The method of claim 11, including computing a time dependent relativistic clock error for each of the satellites and correcting the position of the rover station based thereon.

21. The method of claim 11, further including embodying a program of instructions on a computer readable medium, where the program is to make data processing means to execute the method of claim 11.

22. The method of claim 21, further comprising:

providing a computer program product comprising the computer readable medium according to claim 21.

* * * * *